(12) United States Patent
Kent

(10) Patent No.: US 7,674,378 B2
(45) Date of Patent: Mar. 9, 2010

(54) WETLAND WATER TREATMENT SYSTEM

(75) Inventor: Greg B. Kent, Oceanside, CA (US)

(73) Assignee: Modular Wetland Systems, Inc., Oceanside, CA (US)

( * ) Notice: Subject to any disclaimer, the term of this patent is extended or adjusted under 35 U.S.C. 154(b) by 182 days.

(21) Appl. No.: 11/931,199

(22) Filed: Oct. 31, 2007

(65) Prior Publication Data

US 2008/0142438 A1 Jun. 19, 2008

Related U.S. Application Data

(60) Provisional application No. 60/870,660, filed on Dec. 19, 2006.

(51) Int. Cl.
*C02F 3/32* (2006.01)
*B01D 21/00* (2006.01)

(52) U.S. Cl. ............... 210/602; 210/170.03; 210/512.1; 210/513

(58) Field of Classification Search ................. 210/602, 210/170.03, 512.1, 513, 747
See application file for complete search history.

(56) References Cited

U.S. PATENT DOCUMENTS

| | | | | |
|---|---|---|---|---|
| 4,225,434 | A | * | 9/1980 | Ernst et al. ..................... 210/98 |
| 5,174,897 | A | * | 12/1992 | Wengrzynek ............... 210/602 |
| 5,437,786 | A | | 8/1995 | Horsley |
| 5,549,817 | A | | 8/1996 | Horsley |
| 5,653,255 | A | | 8/1997 | Platz |
| 5,702,593 | A | | 12/1997 | Horsley |
| 6,569,321 | B2 | | 5/2003 | Coffman |
| 6,592,761 | B2 | * | 7/2003 | Wofford ..................... 210/602 |
| 2003/0024874 | A1 | * | 2/2003 | Wallace et al. .............. 210/602 |
| 2003/0047509 | A1 | * | 3/2003 | Whitehill ..................... 210/616 |
| 2004/0173522 | A1 | * | 9/2004 | Allard ........................ 210/602 |

\* cited by examiner

*Primary Examiner*—Fred Prince
(74) *Attorney, Agent, or Firm*—Lisel M. Ferguson; Procopio, Cory, Hargreaves & Savitch, LLP

(57) ABSTRACT

A self-contained wetlands treatment system to remove pollutants from water and treat stormwater runoff or other grey water. This is system and method wherein the water is passed through a wetland filtering and treatment system. This invention removes solids, metals (dissolved/particulate), nutrients (dissolved/particulate), oils, and bacterial contaminants from the water. The system and system housing can be fabricated, built, and assembled in a broad range of sizes and materials to accommodate and treat a broad range of influent flow rates.

19 Claims, 8 Drawing Sheets

WETLAND WATER TREATMENT SYSTEM

CROSS-REFERENCE TO RELATED APPLICATIONS

This application claims the benefit of U.S. Provisional Patent Application Ser. No. 60/870,660, filed Dec. 19, 2006, entitled "Wetland Water Treatment System" which is hereby incorporated by reference in its entirety.

FIELD OF THE INVENTION

The present invention relates, in general, to a water treatment system and a method of using the same. More particularly, the present invention relates to a system which removes pollutants from water and treats stormwater runoff or other grey water. This is system and method wherein the water is passed through a wetland filtering and treatment system. This invention removes solids, metals (dissolved/particulate), nutrients (dissolved/particulate), oils, and bacterial contaminants from the water.

BACKGROUND OF THE INVENTION

Water treatment systems have been in existence for many years. These systems treat stormwater surface run-off or other polluted water. Stormwater surface runoff is of concern for two main reasons: one because of the effects of its volume and flow rate, and two, because of the pollution and contamination it can carry. The volume and flow rate of stormwater is important because high volumes and high flow rates can cause erosion and flooding. Pollution and contamination are important because stormwater is carried into our rivers and streams, from there into our lakes and wetlands, and furthermore because it can eventually reach our oceans. Pollution and contamination that is carried by stormwater can have adverse affects on the health and ecological balance of the environment.

Beginning in 1972 with the passage of the Clean Water Act the federal government through the Environmental Protection Agency has mandated progressively tighter controls over the quantities of pollutants and contaminants that are allowed to be released into our nation's waters. These progressively tighter mandates also encompass control of peak flows and/or volumes and the rate at which they can be discharged into existing water ways or drainage infrastructures. These resulting mandates and controls have given birth to new programs and procedures collectively referred to as stormwater management. Devices and procedure that remove or reduce the pollutants and contaminates and/or control peak flows and volumes are often referred to as best management practices or BMPs. BMPs utilize natural means, artificial or man-made means, and even combinations of either and/or both. Some examples of these BMPs include trash filters, sedimentation basins, retention and detention ponds, wetlands, infiltration trenches, grass swales, various types of media filters, and various types of natural filter systems including sand filters, and aggregate filters including natural and artificial wetlands. These BMPs typically use one or more mechanisms to remove the pollutants and contaminates. These mechanisms include sedimentation, filtration, absorption, adsorption, flocculation, stripping, leaching, bioremediation, and chemical process including oxidation reduction, ion exchange, and precipitation.

Furthermore, stormwater treatment systems can also be classified in relationship to the treatment level in which they are being used. In this respect the term treatment is generally used to describe the unit processes that are used to reduce the quantities of pollutants and containments in stormwater runoff. For example, basic or pre-treatment typically refers to the removal of gross solids, sediments and larger debris through the processes of settling and screening, while enhanced or advanced treatment typically refers to processes for reducing targeted pollutants; filtration being the main form of enhanced treatment for stormwater. Filtration utilizes a combination of physical, chemical, and biological processes. Types of filtration greatly vary dependent on the media use. Medias can be both inert and/or sorbent and are also strongly linked to natural biological processes that thrive in and/or around the media environment. Advanced filtration techniques especially include chemical and biological processes and generally include, but are not limited to processes that bring stormwater in contact with plants including both macrophytes and microphytes, plants that are both visible and invisible to the naked eye. One type of stormwater treatment system that is especially effective at advanced treatment is known as a wetlands system or often simply referred to as a wetlands.

When creating a constructed wetlands, the objective is to minimize the size of the media to maximize the surface area of the media and to also maximize contact time with possible biofilm which can grow on the media, but also to provide media sufficiently large so that the interspacing will not be occluded with the sedimentation that is being carried in the treated water. Accordingly, as a matter of practicality it makes sense to remove as much sediment as possible before allowing the water to enter the wetlands system. In this respect the design of an effective treatment system would contain sufficient screening to remove trash and debris, sufficient sedimentation to remove sediment to a level sufficient to maximize the use of the wetlands. And to preserve efficient operation of the system, the system should be operated at an appropriate flow rate that maintains and preserves the life and operation of the system as a whole. The average or mean time that water remains in contact with the wetlands system is termed the hydraulic resident time or HRT of the wetlands.

Given uniform flow through the sediment chamber, the sedimentation HRT is proportional to the volume of the chamber and inversely proportional to the flow rate. The time required for a particle to settle a specific distance is often referred as the settling time for that particle size and density. Because deeper settling chambers require a greater distance for particles to settle, deeper settling chambers have longer respective settling times. And, because the volume of a sediment chamber is also proportional to the depth of the chamber, increasing the depth increases both the volume (and thereby the HRT) and the settling time. Therefore, increasing the depth of the chamber increases the HRT, but may not increase settling efficiencies since the distance to settle increases proportionally with increase in HRT. Accordingly, the overriding principle of achieving effective sedimentation is to provide the maximum surface and floor areas in the chamber as possible. Other considerations are to increase the path length through the sediment chamber to increase the uniformity of the flow and to prevent high flow rate conditions from re-suspending existing sediment (often referred to as scouring).

In a similar manner, the basic principles separation that apply to the settling of particles more dense than water apply to particles that are less dense than water except that the particles float to the surface rather than settle to the bottom of the chamber. Because oils and hydrocarbons are typically less dense than water, because these products can often be separated mechanically by flotation, and because the products can create adverse biological demands on a wetlands system placed downstream of the sedimentation and flotation chamber, it makes sense to allow the floatable products to remain in the chamber and to remove the out-flow water from below the surface.

Because the objective of a sedimentation and flotation chamber is to remove sediment and floatable products from the incoming water, the accumulated sediment and floatable products will require periodic removal. Systems that are configured to allow easy removal of these products will undoubtedly provide reduced maintenance costs.

Flow-rate control is another consideration. Because the performance of some BMPs like sedimentation and flotation chambers and wetlands systems is dependent on hydraulic resident times (HRTs), optimum performance can be obtained by having sufficient control to not allow flow rates to vary excessively beyond certain limits. Devices that can be used to control the flow rate include bypass controls and inlet and outlet control systems such as adjustable valves or orfice plates.

Because some treatment locations may have high levels of specific pollutants and contaminates, specific configurations using additional BMPs may provide benefits and advantages above typical or standard configurations. Such BMPs may include additional filter systems, additional media chambers, aeration, bioremediation systems, irrigation systems, and mixing manifolds. Any system that can be configured to accommodate additional devices and methods of pollution and contaminate removal is by definition a more versatile BMP.

There is, thus, a need for a wetlands stormwater treatment system which can treat high levels of specific pollutants and contaminants.

SUMMARY OF THE INVENTION

This invention involves a method for manufacturing and using a wetlands water treatment system ("system") which is reliable, dependable, effective, low maintenance and structurally sound. This is a self-contained wetlands treatment system. The system and housing is easy to maintain and construct. It increases the ability to remove nitrogen with the addition of an anaerobic environment in the lower chamber which promotes denitrification. The system and system housing can be fabricated, built, and assembled in a broad range of sizes and materials to accommodate and treat a broad range of influent flow rates. The functional components of the system can be selected, sized, tailored, and assembled to provide a range of performance and options from basic configurations to customized configurations which provide levels of performance suited to specific or individual situations which may require various unique solutions to treat stormwater or even other wastewater.

The system is capable of treating large volumes of polluted or contaminated water. Contaminated water or run-off can include urban run-off, agricultural run-off, and urban, agricultural, commercial or industrial wastewater. This system is beneficial and can be used in many locations, some locations are residential subdivisions, commercial developments, industrial sites, roads and highways, reconstructions, habitat restorations, lake shores, marinas and landings, collection pools, parking lots, transportation terminals and maintenance facilities. The system configuration is adaptable to the local conditions permitting its effective use wherever water treatment is needed or desired. This system is designed to connect to existing drainage collection structures. It contains a vegetated filtration bed, which houses the wetlands system, where plants may grow. From the surface all that is seen of this system is the center cap. The system has a low discharge rate (1-50 gal/min) allowing it to be used in any type of soil. The low discharge rate will also meet possible hydromodification requirements. Thus, in these types of situations the unit will not only provide treatment, but also necessary flow control.

As water flows through the root zone of the wetlands microbes metabolize petroleum hydrocarbons, nitrogen and other pollutants. The pollutants are attenuated via the processes of filtration, absorption, adsorption, bio-accumulation and bio-remediation. Precipitation of metals and phosphorous occurs within the wetland substrate while biochemical reactions, including decomposition, provide treatment of stormwater prior to discharge. In this system, there are two levels of treatment—basic and enhanced. The basic treatment takes place in the lower sedimentation chamber while the enhanced takes place in the upper treatment chamber which contains the vegetated filtration bed of the system.

Influent is piped into the lower sedimentation chamber where larger, heavier solids are removed. The water enters the lower sedimentation chamber through an inflow pipe which makes a 90° angle upon entry. This angle, along with a flow director, forces the water to rotate in a circular motion through the lower sedimentation chamber allowing the heavier solids to fall out to the bottom of the chamber, and lighter pollutants such as oils rise. The flow director, also known as the anti-scouring velocity minimizer, directs incoming flow and turbulence in a circular inner spiraling path. This flow director not only directs flow in a circular motion, it also prevents scouring of fine sediments which have been captured in the middle bottom of the chamber. Without the shield incoming flows and turbulence could resuspend previously captured sediments. Once the heavier sediments have been removed the water rises through the transfer riser of the system and flows through water transfer orifices into the upper treatment chamber which contains a vegetated filtration bed.

When the water flows out of the transfer riser it is directed again in a circular motion through the vegetated filtration bed. Once the water filters through the entire system and is cleaned of all the pollutants it exits through the outflow pipe. This outflow pipe directs treated water into the surrounding soil or is discharged to the existing drainage infrastructure. The setup of this system allows it to process a large volume of storm or grey water. There is an outlet control valve on the outflow pipe.

This valve can be used to set the desired discharge rate over a range of varying head pressures. It can also be closed to contain pollutants or maintain sufficient water in the system. The outlet control valve can be a simple ball type valve which can limit the amount of water which can be discharged from the system.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DETAILED DESCRIPTION OF PREFERRED EMBODIMENTS

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Figure 1:
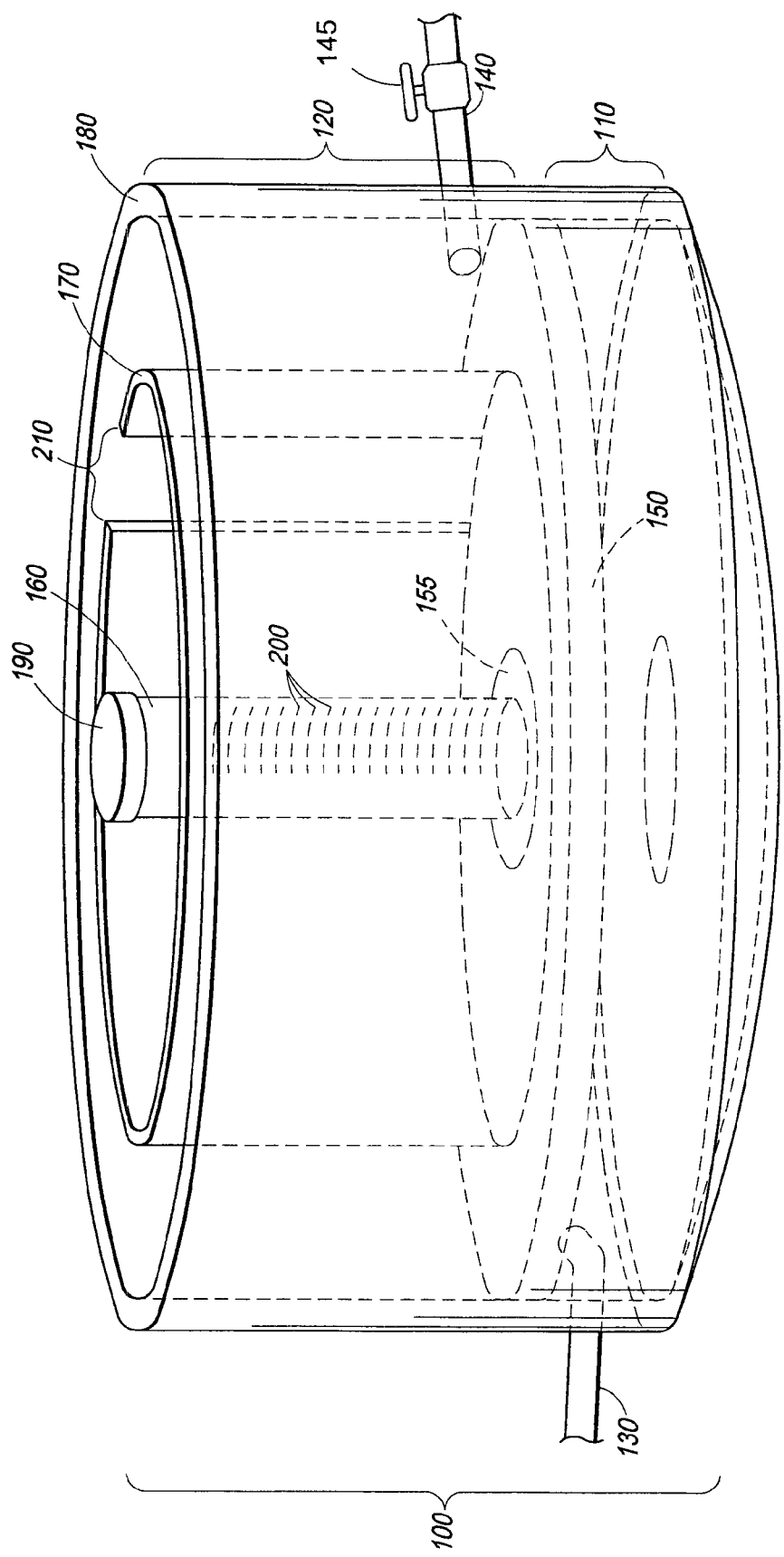
FIG. 1 is a perspective view of an embodiment of a wetlands water treatment system looking into the interior.

With reference to FIG. 1 a wetland water treatment system ("system") 100 is shown and displayed. This system is composed of a sedimentation chamber 110 also known as a hydrodynamic separator, a treatment chamber 120 containing vegetated filtration bed FIG. 2 (225), an inflow pipe 130, an outflow pipe 140, a chamber separator 150, emergency access hatch 155, and a transfer riser 160 also known as a clean out tube. The sedimentation chamber 110 is located below the treatment chamber 120 and the two are separated by the chamber separator 150. A centrally located transfer riser 160 runs from the top of the system through the chamber separator 150. This transfer riser 160 which is a hollow tube runs through and extends a short length below the bottom of the chamber separator 150 and extends into the sedimentation chamber 110 connecting the two.

The bottom of the transfer riser 160 is open so that water from the sedimentation chamber 110 may enter. The top of the transfer riser 160 which extends above ground level is fitted with a cap called a cleanout lid 190 so that no debris can fall into the system from the surface. This cleanout lid 190 can be removed to allow access to the interior of the system for cleaning or other purposes. When water enters the sedimentation chamber 110 through the inflow pipe 130 oils will rise to the top of the water and will not enter the transfer riser 160 as it extends below the water's surface. In another embodiment the transfer riser 160 can extend almost to the bottom of the sedimentation chamber 110. The transfer riser 160 allows for water to seep into the treatment chamber 120 which contains a vegetated filtration bed FIG. 2 (225) for filtration. This vegetated filtration bed FIG. 2 (225) can contain various types of filtration media which will be explained in more detail in FIG. 6.

The transfer riser 160 further allows for access by the user for sediment removal and cleanout of the system. Water flows into the inflow pipe 130 and directly into the sedimentation chamber 110. The inflow pipe makes a 90° angle upon its entry into the sedimentation chamber 110. The water entering the sedimentation chamber 110 is directed to flow in a circular motion through the sedimentation chamber 110 by a flow shield described in more detail in FIG. 4 below. The denser particles of matter settle to the bottom of the sedimentation chamber 110 the water then rises into the transfer riser 160 and filters out through water transfer orifices 200 in the riser into the vegetated filtration bed FIG. 2 (225) where the pollutants are filtered out.

Figure 2:
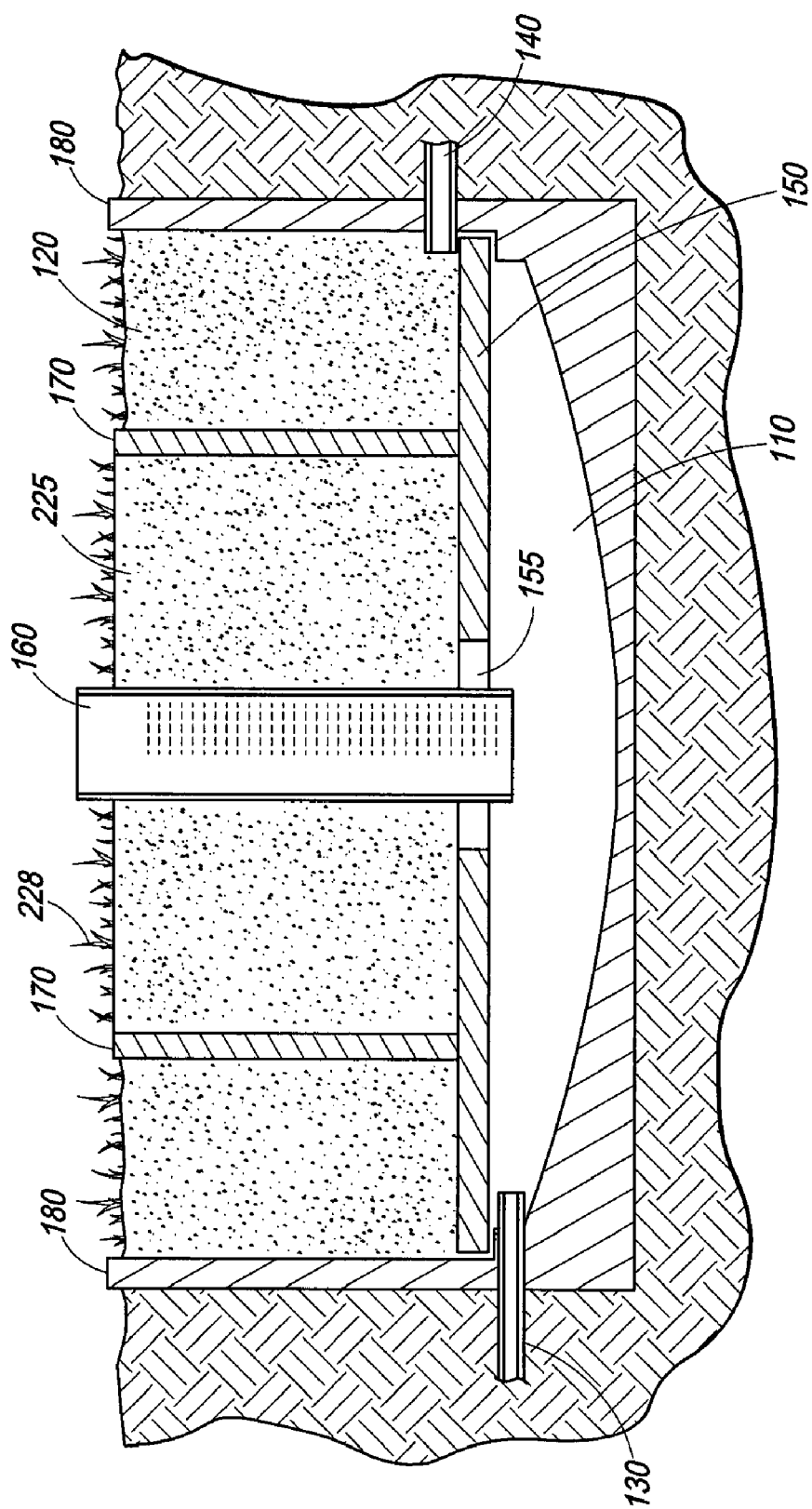
FIG. 2 is a cross-sectional view of the wetlands water treatment system shown in FIG. 1.

Referring to FIG. 2, as contaminated water exits the transfer riser 160 through the water transfer orifices 200 and enters the vegetated filtration bed 225 it will come in contact with the filtration media contained in the vegetated filtration bed. Initially, filtration of pollutants will occur on the surface of the filtration media. In the treatment chamber 120, it should be noted that sedimentation will continue to occur. Relatively larger particles will become trapped within the void space between the filtration media particles. Smaller particles and dissolved pollutants will be captured, transformed, consumed by the following biological and chemical processes. Biological nitrification and denitrification will occur in the vegetated filtration bed 225 as may natural unassisted precipitation of dissolved pollutants on media, in particular phosphorus and metals. A biomass (plants) 228 will develop on the filtration media surface. The biomass 228 is sustained by dissolved organic compounds in the water and contributes to biological intake, absorption, and trapping of pollutants. The roots of the biomass 228 grow into the filtration media creating a root zone. The biomass 228 enhances removal of fine sediments, metals, nutrients, bacteria and/or viruses. The biomass 228 also increases the rate of bioaccumulation of pollutants within the vegetated filtration bed 225. Dependent on the specific characteristics of the filtration media and the amount of plant/root matter within the bed, the processes of ion exchange, adsorption, and/or absorption will occur. Dependent on the type and ratios of filtration media used, variations in the amount and effectiveness of the above processes will vary.

The treatment chamber 120 is set up in such a manner so that the water flows in a circular direction throughout the entire vegetated d filtration bed 225 and exits the outflow pipe 140 once it has been cleaned of pollutants. The specific design of this chamber will be explained in more detail in FIGS. 2 and 3 below.

This system can be connected via the inflow pipe 130 to storm water drains, underground sedimentation tanks, sedimentation ponds, or other bodies of water or stormwater capturing devices which may contain polluted water which needs to be cleaned. This system can be described as a horizontal/vertical up flow hybrid filtration system with the additional unique feature in which the inlet and outlet to the chamber are positioned in such a manner as to require the circular motion of the water within the system. The system 100 is a single chamber design, this leads reduced maintenance and increased efficiency over multi-chamber sedimentation systems in which there are interconnections by elaborate hoses and floatation devices. Systems with many interconnections can become restricted and plugged when sediment levels reach the bulk head ports.

FIG. 2 is a cross-sectional view of the system 100. FIG. 2 shows the treatment chamber 120 filled with a filtration media to create the vegetated filtration bed 225. The filtration media can be gravel or other materials as described in FIG. 6. In the system 100 shown in FIG. 2 biomass 228 is growing at the top of the vegetated filtration bed 225. The top of the vegetated filtration bed 225 sits at ground level and the transfer riser 160 with its cleanout lid 190 extends slightly above ground level.

Figure 3:
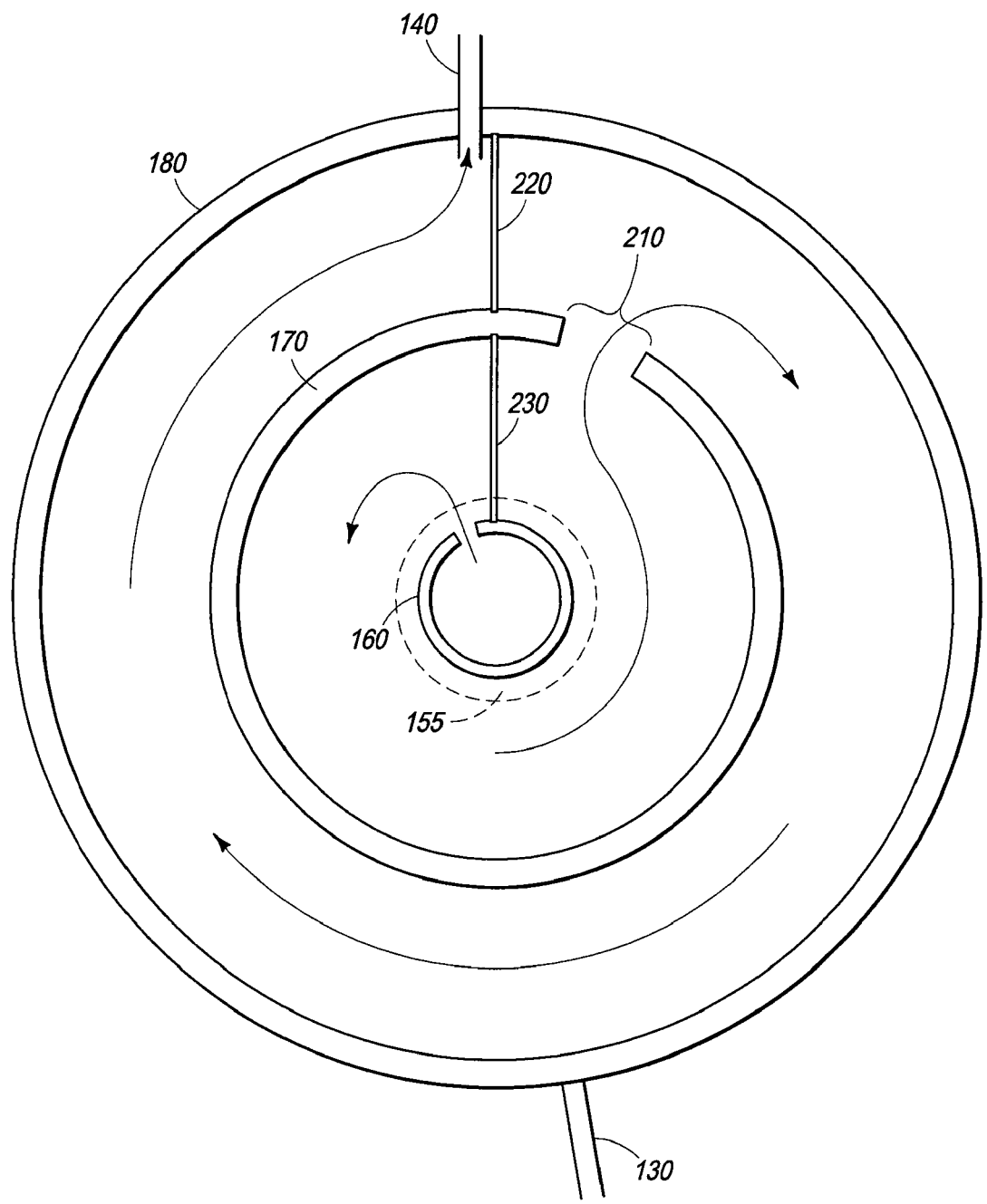
FIG. 3 is a top plan view of a lateral cross-section of the upper treatment chamber of the treatment system in FIG. 1 showing the flow path for water.

FIG. 3 is a top plan view of the lateral cross-section of the upper treatment chamber 120. The water flows out of the transfer riser 160 through the water transfer orifices FIG. 1

(200) which can be slits or holes located the entire length of one of its sides. An inner chamber flow director partition 230 sits between the transfer riser 160 and the inner chamber wall 170 of the chamber. This inner chamber flow director partition 230 can be removed or replaced and inserts into grooves located in the transfer riser 160 and the inner chamber wall 170. This flow director partition forms 230 a solid barrier which sits flush on the chamber separator FIG. 1 (150) at its base. The water flows out of the transfer riser 160 and makes a circular motion within the inner chamber wall 170. The water flows until it hits the opening in the central wall the chamber transfer partition 210 and flows out into the space between the interior wall 170 and outer chamber wall 180.

An outer chamber flow director partition 220 forms a wall between the inner chamber wall 170 and the outer chamber wall 180 so that the water can only pass in one circular direction. This outer chamber flow director partition 220 fits into grooves located in the inner chamber wall 170 and outer chamber wall 180 and can be removed or replaced if necessary. In a preferred embodiment both flow director partitions 220 and 230 are made of a hard plastic or other non-corrodible rigid substance. The outer chamber flow director partition 220 forms a solid barrier between the walls 170 and 180 this partition extends all the way down to the chamber separator FIG. 1 (150) which is a false floor of the system. The water flows in a circular motion through space between the inner chamber wall 170 and the outer chamber wall 180 until it makes a complete circle. While the water is making its second full rotation of the chamber between the inner and outer wall it is further cleaned. Once the water makes a complete circle it reaches the far side of the outer chamber flow director partition 220 and is directed out of the system through the outflow pipe 140.

Figure 4:
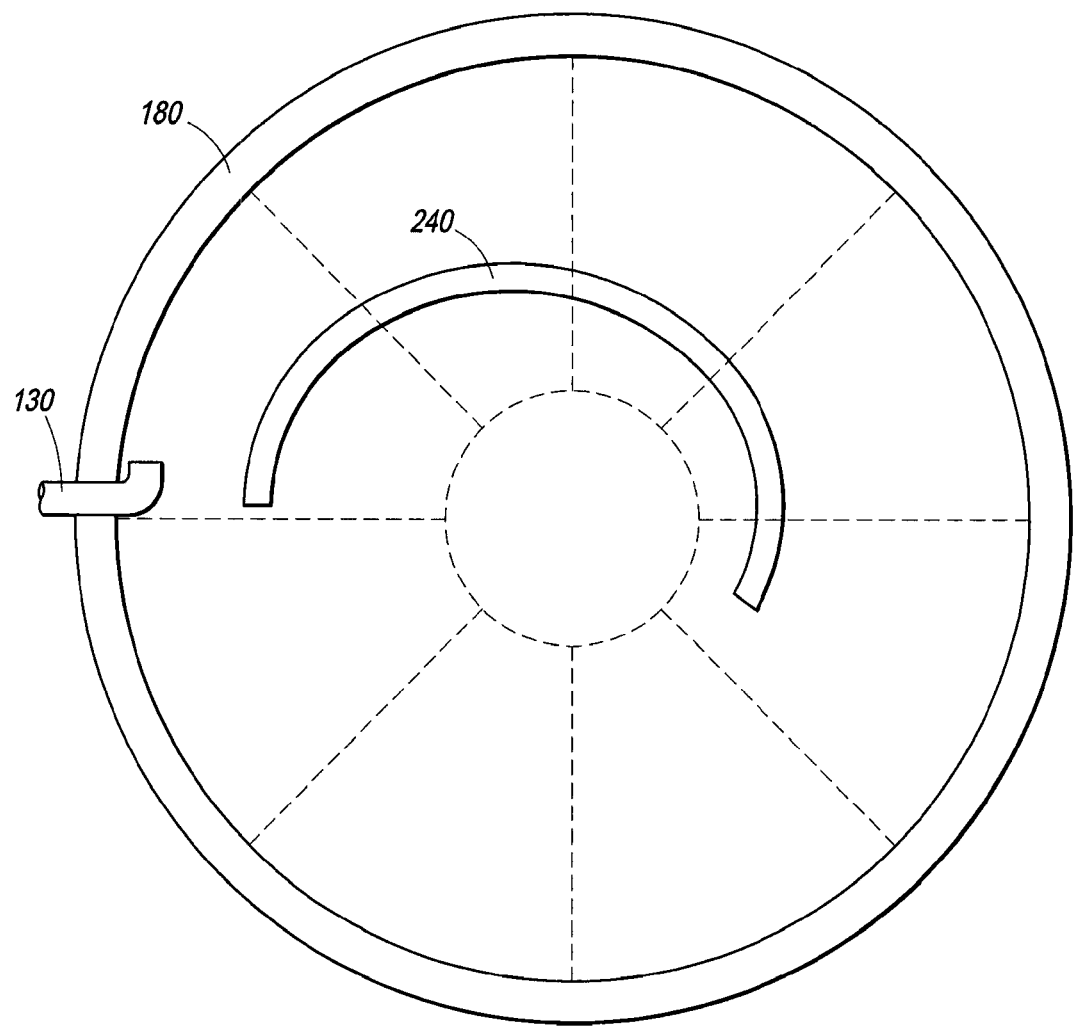
FIG. 4 is a top plan view of a lateral cross-section of the lower sedimentation chamber of the treatment system in FIG. 1.

Referring to FIG. 4 which shows the lower sedimentation chamber FIG. 1 (110) the inflow pipe 130 is shown. This pipe comes into the chamber and makes an abrupt 90° turn. The 90° turn of the inflow pipe 130 directs water in a circular motion around the sedimentation chamber. To enhance the circular motion of the water there is an anti-scouring flow director 240 which not only prevents scouring of previously capture pollutants (located in the bottom/center of the sump). This flow director 240 also enhances the circular motion of the inflowing water by controlling the rate and direction of the water to a gradual circular spiral toward the center of the sump. In a preferred embodiment the flow director 240 is constructed from concrete. The bottom of the sedimentation chamber 110 is called the sump and it is concave or curved shape which further directs the water to its center. In a preferred embodiment there is an emergency access hatch FIG. 1 (155) which forms a donut shape around the transfer riser FIG. 1 (160). The access hatch 155 can be removed allowing access through the chamber separator FIG. 1 (150) to the sedimentation chamber 110 so that the unforeseen situations can be easily and effectively addressed. In a preferred embodiment the emergency access hatch 155 is approximately 30 inches in diameter.

Figure 5:
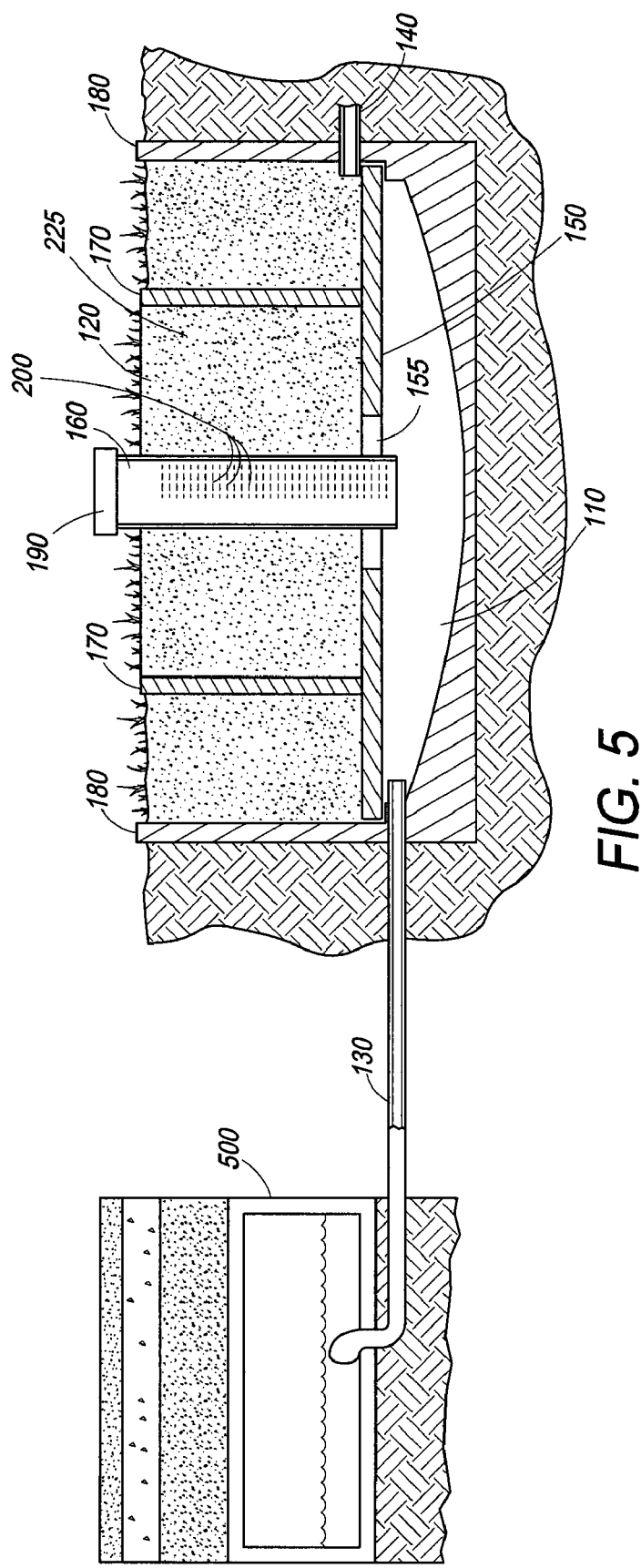
FIG. 5 is a cross sectional view of a underground stormwater storage tank feeding water into a treatment system shown in FIG. 1.

Referring to FIG. 5 water is seen coming from an underground storage tank 500. The water flows from the underground storage tank into the system through the inflow pipe 130. The water enters the sedimentation chamber 110 and is directed in a circular motion through this chamber. The water rises out of this chamber through the transfer riser 160. The water exits the transfer riser 160 through the water transfer orifices 200. The water flows into the treatment chamber 120 and is directed in a circular motion by the intricate system set forth in FIG. 3, supra. When looking at the system from a top angle, all one can see is the cleanout lid 190 of the transfer riser 160 extending slightly above the ground, the rest of the system 100 is covered with biomass (vegetation) 228 and looks like a normal planting ground. Once the water makes its circular rotations throughout the treatment chamber 120 and is cleaned it exits the system through the outflow pipe 140.

Figure 6:
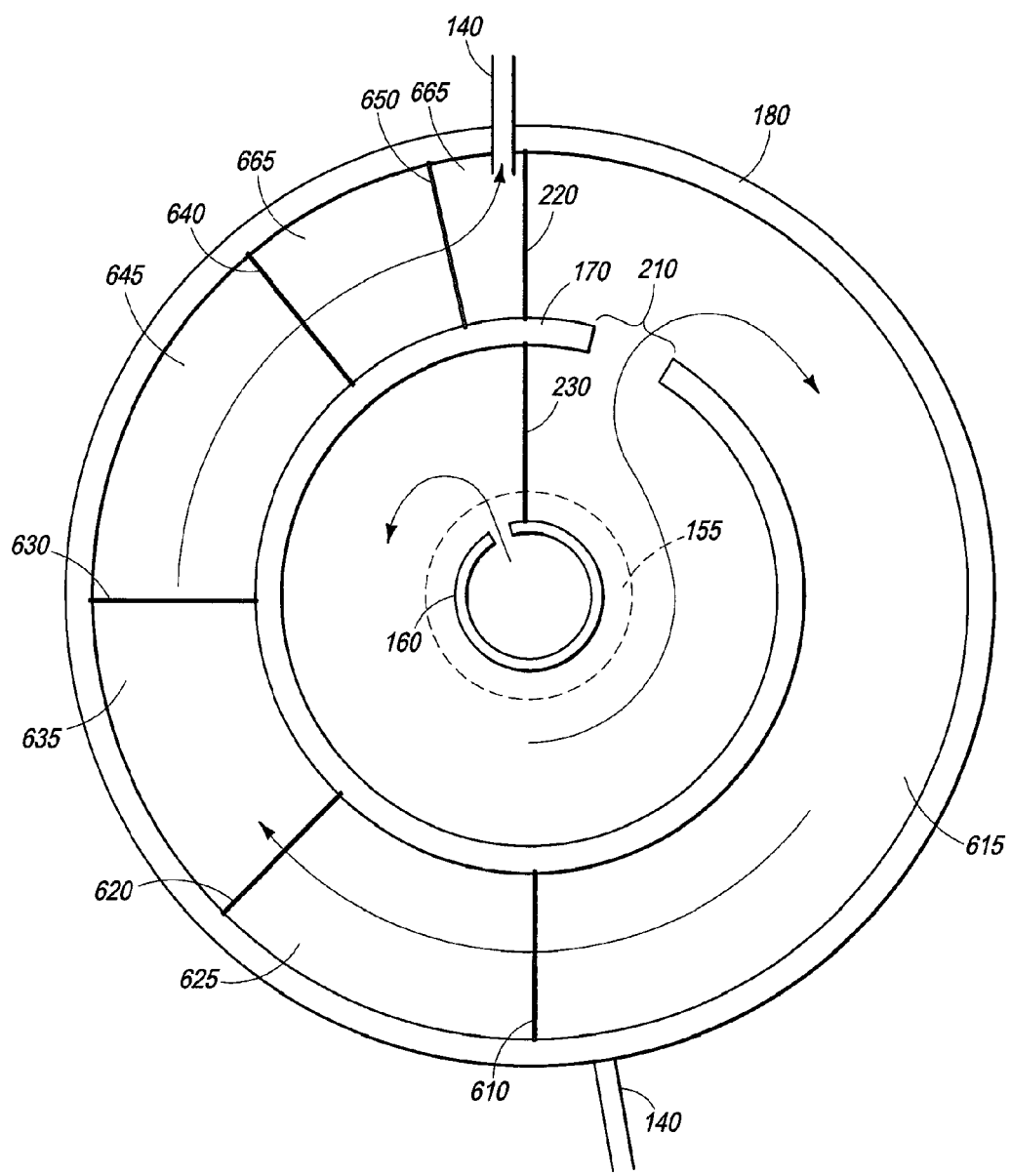
FIG. 6 is the view of the treatment system shown in FIG. 3 with the additional of filtration screens to allow sectioning of multiple types of filtration media.

Referring to FIG. 6, a cross-section of the treatment chamber 120 looking from the top is seen. FIG. 6 shows an embodiment of the system 100 where filtration screens 610, 620, 630, 640 and 650 are inserted. The insertion of filtration screens allows different types of filtration media to be placed in different sections of the vegetated filtration bed FIG. 2 (225). These filtration screens fit between the inner chamber wall 170 and the outer chamber wall 180. They slide into grooves which have been made in the inner chamber wall 170 and the outer chamber wall 180. The grooves are inserted directly across from one another and run the length of the walls so that the filtration screens can be slid into the groove and makes contact with the walls 170 and 180 at the sides and chamber separator FIG. 1 (150) at the bottom. The screens are made of a porous material which can be a mesh, netting, and/or screen to allow water to freely pass through but keep larger molecules such as the filtration media separated. The system can be flitted with one screen or multiple screens such as is seen here in FIG. 6. In FIG. 6 the five filtration screens 610, 620, 630, 640, and 650 are inserted to create six separate compartments for filtration media. Each compartment can contain different filtration media. They thus form six filtration media compartments 615, 625, 635, 645, 655 and 665.

In one embodiment, stone can be inserted for pre-treatment into one of the filtration media compartments of the treatment chamber 120; Perlite can be inserted in another compartment for oil, nutrients and fine sediment removal; BIOSORB® absorbent polymer can be inserted into a third compartment for the removal of hydrocarbons, sediment and dissolved metals; Zeolite can be inserted into another partition for the removal of nutrients and soluble materials, and in yet another partitioned segment of the treatment chamber 120 Granular activated charcoal can be inserted for the removal of nutrients, herbicides, pesticides. A compartment could also be filled with antimicrobial media such as hydroxyl apatite, silver modified media, or other positively charge media which would remove bacteria, and coliform polishing.

In the embodiment shown in FIG. 6, where five filtration screens 610, 620, 630, 640 and 650 have been inserted in order to segment off sections of the treatment chamber 120, the first and largest compartment 615 could contain washed stone. The water exits the transfer riser 160 and flow the entire circle from between this tube and the inner chamber wall 170 it passes through the filtration media in the treatment chamber 120. The water passes through the first screen into the next compartment which could contain Perlite for a filtration media. The water would flow through the Perlite in order to filter out oil, nutrients and other fine sediment. The water would next pass through the second filtration screen 620 into the next chamber 635 which could contain the BIOSORB® absorbent polymer. The BIOSORB® absorbent polymer would remove hydrocarbons, sediments and dissolved metals. Once the water pass through chamber 635 it could then pass through the screen 630 into the next sedimentation chamber 645 which could contain Zeolite. Zeolite would then remove nutrients and other soluble metals. Once the water had passed through chamber 645 it would flow through screen 640 into chamber 655. In one embodiment chamber 655 could contain granular activated carbon; this substance would remove herbicides and pesticides. Once the water had passed through chamber 655 it would flow through the screen at 650 and into the final filtration media chamber 665. In one embodiment 665 could contain positively charged media which would remove bacteria and perform coliform polishing. Once the water had passed through chamber 665 it would exit through the outflow 140 which has an outflow control valve FIG. 1 (145) to regulate the flow of the water.

Figure 7A:
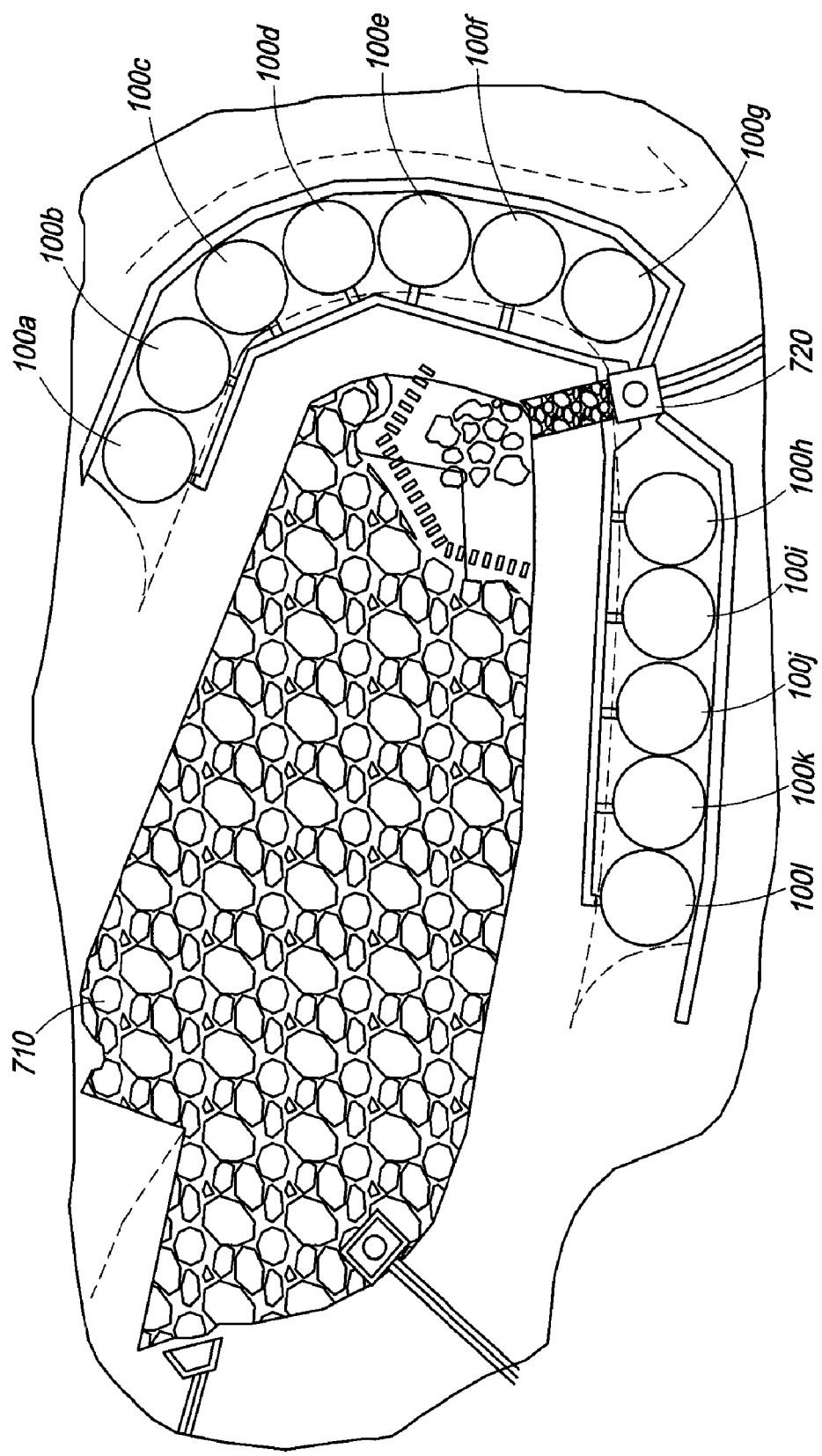
FIG. 7a is a graphical representation of multiple treatment systems around a detention basin to provide advanced treatment of the water.

FIG. 7a is a graphical representation displaying multiple systems 100 around a detention basin to provide advanced treatment of the water contained in the detention basin. The water would flow from the detention basin 710 or flow directly from surface runoff through the bypass structure 720 out into pipes that would connect to the systems represented here as 100a through 100l. The water would flow into the systems 100a-1 and be treated as described supra. A detention basin 710 or other pond containing wastewater could be fitted with one or more systems depending on the capacity of the body of water. The setup that is shown in FIG. 7a displays the first flush of runoff being captured by the wetlands, higher flows bypass directly into the detention basin 710. Though this set-up can also be reversed in which all water enters the detention basin 710 first and then the water is slowly processed through the wetland systems 100a through 100l and then is discharged.

Figure 7B:
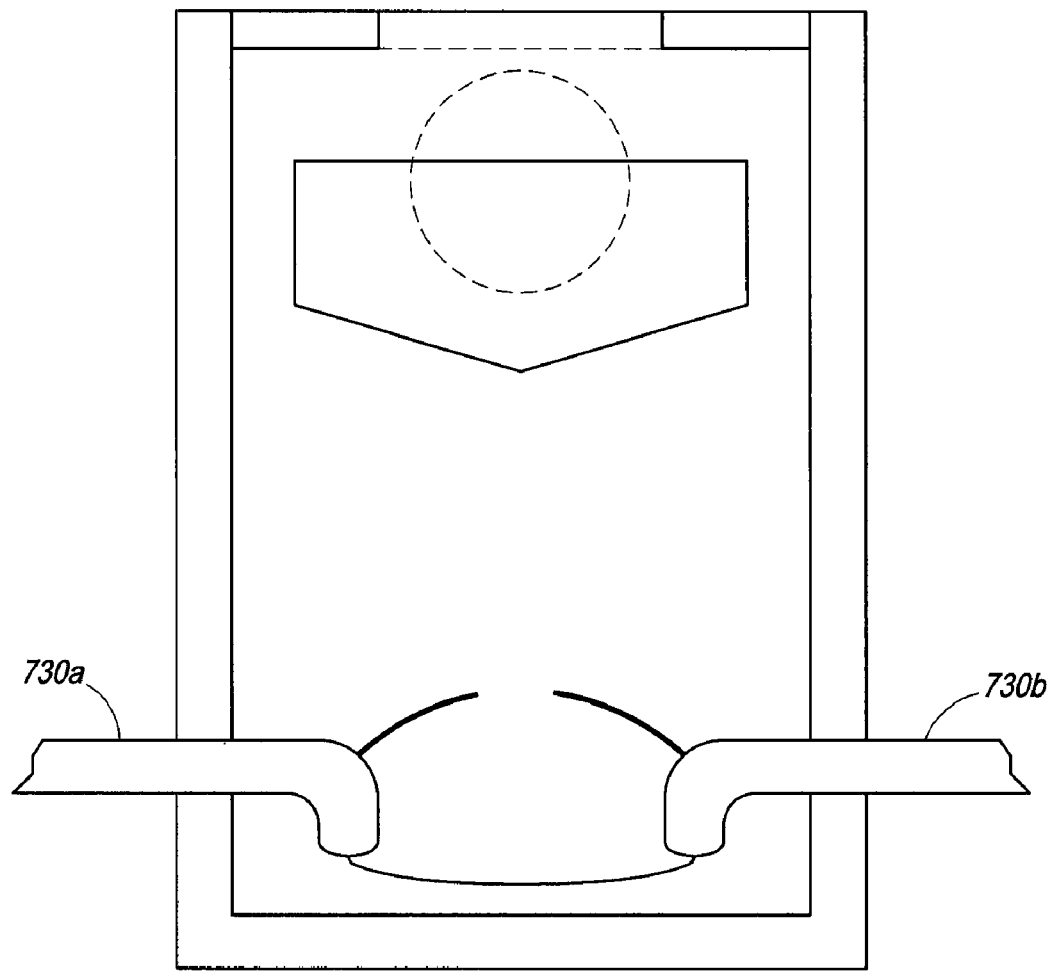
FIG. 7b is a graphical representation of a bypass structure which can be used with the treatment system.

FIG. 7b is a graphical representation of the bypass structure which can be used in the system shown in FIG. 7a. Water enters the bypass structure from the detention basin or an up stream runoff collection system. The water can also enter the bypass structure 7b from the systems 100a-1 if they are filled to capacity. The pipes at the bottom 730a and 730b are connected to the wetland systems 100a through 100L. The water enters the wetland systems; once the systems are to capacity, flows/volumes in access will bypass directly to the detention basin 710, thus bypassing the wetland systems.

The system can be fitted with many optional components in various embodiments. Some of the optional components of the system can be fitted with would include the trash filter system, the up-flow sedimentation filter, and aeration system, biomediation system with metering system, media packaging system, separate oil (floatable liquids) removable system, adjustable flow curve outlook control valve, or single or multi-staged advanced treatment filtration modules.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

The invention claimed is:

1. A water treatment system comprising:
   a sedimentation chamber, the sedimentation chamber including one or more inflow pipes entering into it;
   a transfer riser extending into the sedimentation chamber, the transfer riser including water transfer orifices along its length; and
   a treatment chamber sitting above the sedimentation chamber including an inner chamber wall, one or more outflow pipes, a vegetative filtration bed with filtration media, one or more inner chamber separators, and one or more outer chamber flow directors;
   the treatment chamber being separated from the sedimentation chamber by a chamber separator with the transfer riser running from the sedimentation chamber through the entire height of the treatment chamber.

2. The system of claim 1, wherein the transfer riser extends above the top of the treatment chamber and sticks out above ground level.

3. The system of claim 1, wherein the transfer riser is fitted with a cleanout lid to allow access to the sedimentation chamber for cleaning.

4. The system of claim 1, wherein a chamber separater has an emergency access hatch.

5. The system of claim 1, wherein the one or more inflow pipes make a 90° upon entry into the sedimentation chamber.

6. The system of claim 1, wherein the vegetated filtration bed houses a wetlands system where biomass may grow on the surface and the roots extend into the filtration media creating a root zone.

7. The system of claim 6, wherein water flows through the root zone of the wetlands system and the pollutants are attenuated via the processes of filtration, absorption, adsorption, bio-accumulation and/or bio-remediation.

8. The system of claim 1, wherein the sedimentation chamber contains a flow director which directs the incoming water to flow in a circular motion preventing scouring of fine sediments captured in the bottom of the sedimentation chamber.

9. The system of claim 1, wherein the transfer riser allows the water from the sedimentation chamber to seep into the treatment chamber.

10. The system of claim 1, wherein the vegetative filtration bed contains various types of filtration media.

11. The system of claim 1, wherein the sedimentation chamber is connected via the inflow pipe to a water drain, underground sedimentation tank, sedimentation pond or other body of stormwater capturing device.

12. The system of claim 1, wherein the treatment chamber has one or more filtration screens inserted to create separate sections within the vegetated submerged bed to house different filtration media in each section.

13. The system of claim 12, wherein the filtration screens are made of porous material which can be mesh, netting, and/or screen to allow water to freely pass through.

14. The system of claim 1, wherein the filtration media can be one or more of the following: BIOSORB® absorbent polymer, Perlite and/or Zeolite.

15. A method for cleaning waste water comprising
   receiving an polluted influent and transferring the influent into a sedimentation chamber,
   directing the influent to flow in a circular motion through the sedimentation chamber,
   allowing the denser particles of matter to settle to the bottom of the sedimentation chamber,
   transferring the water in the sedimentation chamber into a treatment chamber by way of a transfer riser pipe manufactured with water transfer orifices,
   treating the water in the treatment chamber by way of a vegetative filtration bed, which includes filtration media and biomass growing on its surface creating a root zone within the filtration media, and
   exuding the cleaned influent out of the system through one or more outflow pipes.

16. The method of claim 15, wherein large particles and pollutants are trapped within the filtration media and smaller particles and dissolved pollutants are consumed by a biological and chemical process.

17. The method of claim 15, wherein the biological and chemical process occurs through biological nitrification and denitrification.

18. The method of claim 15, wherein the water in the treatment chamber is directed in a circular motion.

19. A water treatment system comprising:
one or more wetlands water treatment systems, each comprising a sedimentation chamber;
a treatment chamber; and
a transfer riser running from the sedimentation chamber through the entire height of the treatment chamber with orifices along the length of the transfer riser;
one or more detention basins, configured to accept water runoff and pass water to the one or more wetlands water treatment systems; and
one or more bypass structures, configured to accept water from or pass water to the one or more detention basins or a drainage collection system or the one or more wetlands water treatment systems.

* * * * *